(12) United States Patent
Chi et al.

(10) Patent No.: US 12,042,976 B2
(45) Date of Patent: Jul. 23, 2024

(54) PUNCH PIN HOLE INSPECTION APPARATUS AND METHOD USING PUNCH AND DIE

(71) Applicant: LG Energy Solution, Ltd., Seoul (KR)

(72) Inventors: Ho June Chi, Daejeon (KR); Hang June Choi, Daejeon (KR); Jeong Oh Moon, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/926,470

(22) PCT Filed: Nov. 4, 2021

(86) PCT No.: PCT/KR2021/015839
§ 371 (c)(1),
(2) Date: Nov. 18, 2022

(87) PCT Pub. No.: WO2022/108196
PCT Pub. Date: May 27, 2022

(65) Prior Publication Data
US 2023/0182370 A1    Jun. 15, 2023

(30) Foreign Application Priority Data
Nov. 19, 2020    (KR) .......................... 10-2020-0155805

(51) Int. Cl.
| | | |
|---|---|---|
| B29C 51/08 | (2006.01) | |
| B29C 43/36 | (2006.01) | |
| B29C 43/58 | (2006.01) | |
| B29C 49/22 | (2006.01) | |
| B29C 51/26 | (2006.01) | |
| B29C 51/28 | (2006.01) | |

(Continued)

(52) U.S. Cl.
CPC .......... *B29C 51/082* (2013.01); *B29C 43/361* (2013.01); *B29C 43/58* (2013.01); *B29C 49/22* (2013.01); *B29C 51/262* (2013.01); *B29C 51/28* (2013.01); *B29C 2033/705* (2013.01); *B29C 2043/3602* (2013.01); *B29C 2043/3615* (2013.01); *B29C 2043/585* (2013.01); *B29L 2031/7146* (2013.01)

(58) Field of Classification Search
CPC ................................ B29C 33/68; B21D 22/10
See application file for complete search history.

(56) References Cited

U.S. PATENT DOCUMENTS

| | | |
|---|---|---|
| 2013/0196188 A1 | 8/2013 | Sode et al. |
| 2016/0149179 A1 | 5/2016 | Sode et al. |

(Continued)

FOREIGN PATENT DOCUMENTS

| | | |
|---|---|---|
| CN | 111864160 A | 10/2020 |
| JP | 2008264849 A | 11/2008 |

(Continued)

OTHER PUBLICATIONS

International Search Report for Application No. PCT/KR2021/015839 mailed Feb. 15, 2022, pp. 1-3.

*Primary Examiner* — Benjamin A Schiffman
(74) *Attorney, Agent, or Firm* — Lerner David LLP (57) ABSTRACT

A punch pin hole inspection apparatus and method uses a punch and a die capable of checking defects or damage, specifically pin holes or microcracks, due to shaping immediately after finishing shaping a laminate sheet into a battery case using the punch.

13 Claims, 5 Drawing Sheets

(51) Int. Cl.
  *B29L 31/00*  (2006.01)
  *B29C 33/70*  (2006.01)

(56) References Cited

U.S. PATENT DOCUMENTS

| | | |
|---|---|---|
| 2017/0043386 A1 | 2/2017 | Nakagaito et al. |
| 2017/0222201 A1 | 8/2017 | Sode et al. |
| 2019/0214620 A1 | 7/2019 | Sode et al. |
| 2020/0343505 A1 | 10/2020 | Kon et al. |

FOREIGN PATENT DOCUMENTS

| | | |
|---|---|---|
| JP | 2014209490 A | 11/2014 |
| JP | 2016144824 A | 8/2016 |
| KR | 20160036435 A | 4/2016 |
| KR | 20160130831 A | 11/2016 |
| KR | 20180038765 A | 4/2018 |
| KR | 20190083929 A | 7/2019 |
| KR | 102104310 B1 | 4/2020 |
| WO | 1999008853 A1 | 2/1999 |

FIG. 4 ated steel sheet heated to a temperature
PUNCH PIN HOLE INSPECTION APPARATUS AND METHOD USING PUNCH AND DIE

CROSS-REFERENCE TO RELATED APPLICATIONS

The present application is a national phase entry under 35 U.S.C. § 371 of International Application No. PCT/KR2021/015839, filed on Nov. 4, 2021, and now published as International Publication No. WO 2022/108196, which claims priority from Korean Patent Application No. 10-2020-0155805, filed on Nov. 19, 2020, all of which are hereby incorporated herein by reference in their entireties.

FIELD

The present invention relates to a punch pin hole inspection apparatus using a punch and a die and a punch pin hole inspection method using the same. More particularly, the present invention relates to a punch pin hole inspection apparatus using a punch and a die capable of checking defects or damage due to shaping immediately after finishing shaping using the punch to shape a pouch-shaped battery case.

BACKGROUND

Demand for a secondary battery as an energy source for mobile devices, electric vehicles, etc. has abruptly increased. In particular, demand for a lithium secondary battery, which has high energy density and high discharge voltage, is high.

Based on the shape and material thereof, the lithium secondary battery may be classified as a cylindrical secondary battery made of a metal material, a prismatic secondary battery made of a metal material, or a pouch-shaped secondary battery made of a laminate sheet. The pouch-shaped secondary battery has advantages in that the pouch-shaped secondary battery is stacked with high integrity, thereby having high energy density per unit weight, is manufactured at low cost, and is easily deformable. Consequently, the pouch-shaped secondary battery is used in various devices.

For the pouch-shaped secondary battery, a laminate sheet including an outer coating layer, a metal blocking layer, and an inner adhesive layer is shaped so as to be used as a battery case. An electrode assembly is received in a receiving portion formed in the laminate sheet together with an electrolytic solution, and the receiving portion is hermetically sealed, whereby the pouch-shaped secondary battery is manufactured.

In order to shape the laminate sheet to form an electrode assembly receiving portion, a deep drawing method of disposing the laminate sheet on a die, fixing the laminated sheet, and pressing the laminate sheet using a punch in the state in which the laminate sheet is fixed using a holder is used. During deep drawing, however, defects or damage, such as pin holes or cracks, may be formed in the outer coating layer or the metal blocking layer of the laminate sheet due to limited softness of the laminate sheet and the force of friction between the punch and the laminate sheet.

Even though surface roughness of the punch that contacts the laminate sheet is extremely reduced in order to prevent such external defects, it is difficult to prevent external defects from being formed on the laminate sheet due to friction caused by repeated punching. Particularly, in the case in which the thickness of the laminate sheet, specifically the metal blocking layer, is small, shapeability of the laminate sheet is reduced, whereby pin holes or cracks may be more easily formed.

A case having defects, such as pin holes, must be removed by sorting; however, it is not easy to sense micro-scale pin holes, which are difficult to observe with the naked eye.

Patent Document 1 relates to a hot-pressed product manufacturing method and a hot-pressed product, wherein hot pressing is performed on a surface-treated steel sheet having an Zn—Ni plating layer formed on the surface of a base steel sheet using a press having a die, a blank holder, and a punch, in order to manufacture a hot-pressed product. The edge of the surface-treated steel sheet heated to a temperature between the Ac3 transformation point and 1000° C. is cooled down to a temperature of 550° C. to 400° C. at a cooling speed of 100° C./s in a state of being disposed between the die and the blank holder, pressing is commenced when the temperature of the edge is 550° C. to 400° C., and a pressed body is maintained at a pressing bottom dead center in a state of being disposed in the press such that the pressed body is rapidly cooled after pressing.

Patent Document 1 discloses that whether microcracks are formed is checked in hot pressing using the punch and the die, which is different from the present invention in that the section of a pressed product is checked using a scanning electron microscope. In the case in which the section of the pressed product is checked using a visual method, as in Patent Document 1, too much time is taken, and therefore this method is not suitable for mass production of a laminate sheet for pouch-shaped batteries.

Patent Document 2 relates to a device for detecting pin holes in manufacturing an aramid film. Patent Document 2 discloses a method of disposing electrodes at opposite surfaces of a film that is continuously conveyed, applying voltage, and detecting current therefor to check whether pin holes are formed on the film. Patent Document 2 is applied to a material that is continuously conveyed in a roll shape, such as film or fiber, which is different from a method according to the present invention of applying voltage between a punch and a die without movement of the punch after a pressed body is completed.

Patent Document 3 relates to a press workability evaluation apparatus and a press workability evaluation method, wherein a punch having a multi-branch-shaped convex portion having three or more branches, a die having a concave portion fitted to the convex portion and a die-side planar portion surrounding the concave portion, and a pressing plate having a pressing plate-side planar portion almost parallel to the die-side planar portion are included, and a target material to be pressed is inserted between the die-side planar portion and the pressing plate-side planar portion.

Patent Document 3 discloses that variation, cracks, or breakage of a pressed body is detected in a pressing process using the punch and the die, which is different in fundamental mechanism from the present invention, which measures current, in that marks are transferred to a target material to be pressed, images are captured using a CCD camera before and after processing based on each mark, and the distance between the marks before and after processing is measured to calculate variation. Since Patent Document 3 uses visual materials, application to a laminate sheet having high reflectivity is difficult, and visual analysis is performed over the entire area, whereby rapid detection is impossible.

Patent Document 4 relates to a method of detecting abnormality of a thin plate pressing apparatus, wherein when a thin plate is pressed through relative movement between a punch and a die, at least one of the punch and the die is a press to be measured, and elastic deformation occurring in the press to be measured by pressing, measured by a deformation measurement means installed in the press to be measured, is greater than or less than a predetermined range, pressing abnormality is determined.

Patent Document 4 is different in measurement mechanism from the present invention in that a measurement means, such as a piezoelectric element or a strain gauge, is provided in the punch in order to detect deformation of the punch. Patent Document 4 is used for a metal material, such as a vehicle plate, and when this document is applied to an apparatus that uses current, there may be no discrimination depending on abnormality or not.

A pin hole inspection method that is efficient while being suitable for the characteristics of a laminate sheet used for a battery case has not yet been suggested.

Korean Patent Application Publication No. 2016-0130831 (2016.11.14) ("Patent Document 1")

International Publication No. 1999-008853 (1999.02.25) ("Patent Document 2")

Japanese Patent Application Publication No. 2016-144824 (2016.08.12) ("Patent Document 3")

Japanese Patent Application Publication No. 2008-264849 (2008.11.06) ("Patent Document 4")

SUMMARY OF THE DISCLOSURE

The present invention has been made in view of the above problems, and it is an object of the present invention to provide a punch pin hole inspection apparatus and method using a punch and a die capable of checking defects or damage, specifically pin holes or microcracks, due to shaping immediately after finishing shaping a laminate sheet into a pouch-shaped battery case using the punch.

In order to accomplish the above object, the present invention provides a battery case shaping apparatus including a punch configured to press a laminate sheet in order to form a battery case; a die having formed therein an accommodation portion corresponding in size to an electrode assembly receiving portion formed by the punch; a holder configured to fix the outer edge of the laminate sheet; and a current measurement portion configured to measure current between the punch and the die.

The punch and the die may constitute electrodes, and, when the laminate sheet is disposed between the punch and the die, the current measurement portion may apply voltage to measure a current value therefor.

In the case in which the laminate sheet is disposed, the punch and the die must be electrically insulated from each other. At this time, it is preferable for the punch and the holder to also be insulated from each other.

A conductive elastic separator located under the punch may be added to prevent direct contact between the punch and the laminate sheet. The conductive elastic separator may be made of a conductive elastic rubber material. The conductive elastic separator may be fixed to a lower part of a side surface of the holder. A liquid lubricant may be added to a space defined by the conductive elastic separator and the holder. At this time, the lubricant must be conductive.

In addition, the present invention provides a punch pin hole inspection method of a battery case shaped using the battery case shaping apparatus, the punch pin hole inspection method including S1) disposing a laminate sheet on a die, S2) fixing the laminate sheet to the die using a holder, S3) pressing the elastic separator and the laminate sheet using a punch, and S4) measuring current while applying voltage between the punch and the die.

In step S4), current may be measured while voltage is changed.

Step S4) of measuring current while applying voltage may be replaced by a step of measuring impedance while applying alternating current.

Step S4) of measuring current while applying voltage may be replaced by a step of applying voltage between a metal blocking layer of the laminate sheet and the punch to measure current and applying voltage between a metal blocking layer of the laminate sheet and the die to measure current.

In step S4), uniform distance may be maintained between the punch and the die. This means that the punch and the die are spaced apart from each other by a uniform distance at all positions in the state in which the laminate sheet is disposed between the punch and the die. Only when the punch and the die are spaced apart from each other by a uniform distance, it is possible to check abnormality through flow of current in the entire area.

In step S4), whether punch pin holes are formed may be determined based on whether current flows. At this time, when current flows at a voltage lower than a reference voltage, abnormality of pin holes may be determined.

In addition, the present invention may provide all possible combinations of the above solving means.

As is apparent from the above description, in the present invention, current is measured using a current measurement portion configured to measure current between a punch and a die, whereby it is possible to check defects or damage, specifically pin holes or microcracks, due to shaping immediately after shaping using the punch is finished.

In the present invention, two electrodes, i.e. the punch and the die, are disposed so as to be spaced apart from the entire surface of a laminate sheet having a three-dimensional shape, not a planar shape, by the same distance, and current is applied immediately after shaping is finished, whereby it is possible to perform uniform inspection on the entire surface of the shaped laminate sheet.

Also, in the present invention, a conductive elastic separator is disposed under the punch in order to prevent direct contact between the punch and the laminate sheet, whereby it is possible to prevent excessive mechanical stress due to the punch from being transferred to the laminate sheet. In addition, current is measured in the state in which stress is relieved, whereby it is possible to avoid an error problem in measurement.

In the present invention, an electrode assembly receiving portion is formed by shaping in the state in which the conductive elastic separator is interposed between the laminate sheet and the punch, whereby it is possible to prevent the punch from directly contacting the laminate sheet, and therefore it is possible to minimize a stick-slip effect that occurs on the surface of the punch and the surface of the laminate sheet.

In addition, a liquid lubricant is added between the punch and the conductive elastic separator, whereby it is possible to reduce the force of friction between the punch and the laminate sheet.

In addition, it is possible to enlarge an elongated region of the laminate sheet due to addition of the liquid lubricant and the conductive elastic separator, whereby it is possible to prevent the laminate sheet from being locally excessively elongated and thus thinned.

In addition, when the battery case shaping apparatus and method according to the present invention are used even though laminate sheets having the same thickness are used, it is possible to more deeply form the electrode assembly

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

A laminate sheet used as a case of a pouch-shaped battery is basically an insulator. In general, a laminate sheet including an outer coating layer, a metal blocking layer, and an inner adhesive layer exhibits insulation characteristics. During shaping thereof, however, defects or damage, such as pin holes or cracks, are formed in the outer coating layer or the metal blocking layer of the laminate sheet, whereby insulation characteristics of the laminate sheet are deteriorated.

When the laminate sheet is not abnormal, on the other hand, the insulation characteristics of the laminate sheet are maintained. Consequently, it is possible to determine whether the laminate sheet is abnormal through measurement of the insulation characteristics of the laminate sheet.

In the case in which the extent or size of defects or damage, such as pin holes or cracks, is small, current having discrimination thereon is generated only when high voltage is applied between two electrodes spaced apart from each other by a uniform distance.

The shaped laminate sheet has a three-dimensional shape, not a planar shape. For accurate detection, therefore, the two electrodes must be disposed so as to be spaced apart from the entire surface of the shaped laminate sheet by the same distance.

In many cases, a punch and a die used for shaping are made of a metal material, and the punch and the die have the same shape as the shaped laminate sheet. Consequently, the present invention has been derived in consideration of the fact that, when the punch and the die are used as electrodes, it is possible to accurately detect whether the entire surface of the shaped laminate sheet is abnormal.

Hereinafter, embodiments of the present invention will be described in detail with reference to the accompanying drawings.

Figure 1:
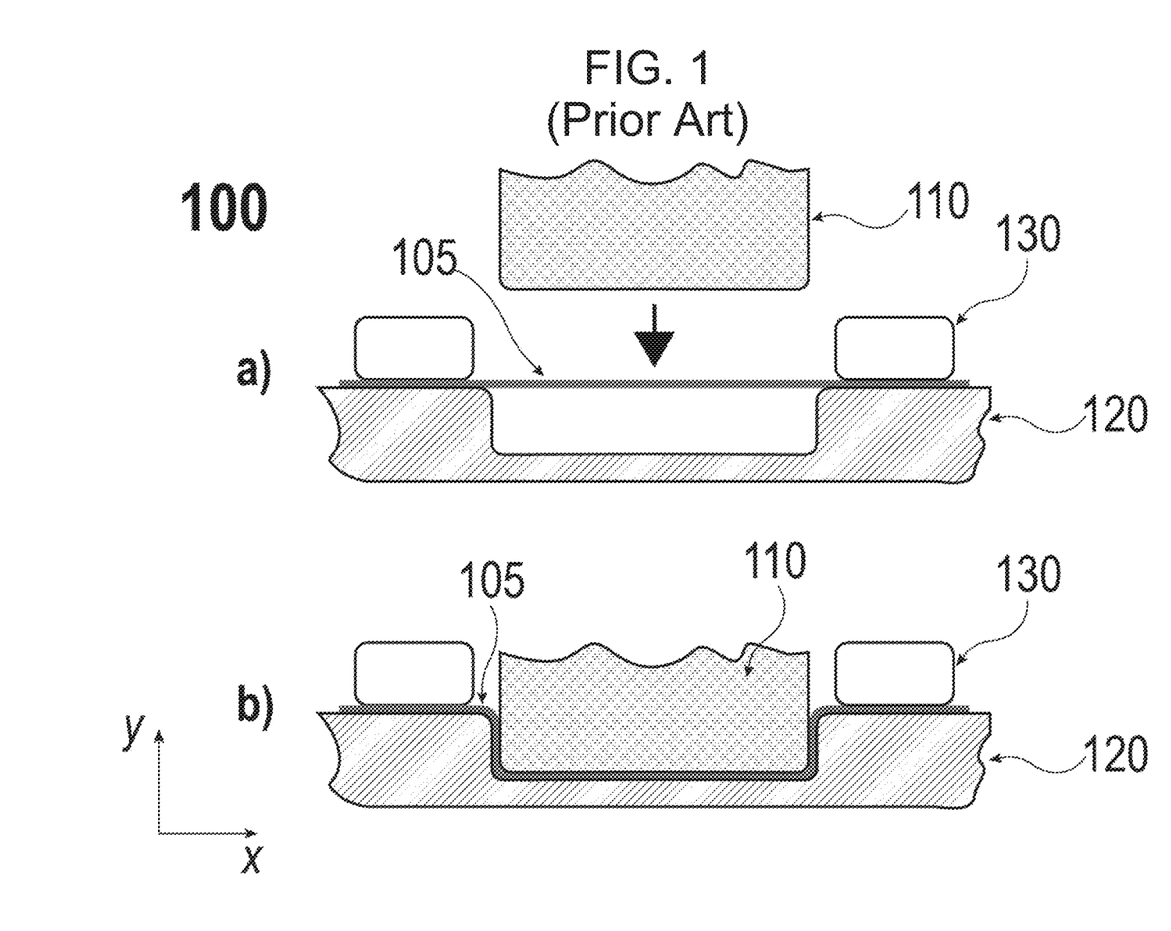
FIG. 1 is a cross-sectional view of a conventional battery case shaping apparatus.
Figure 2:
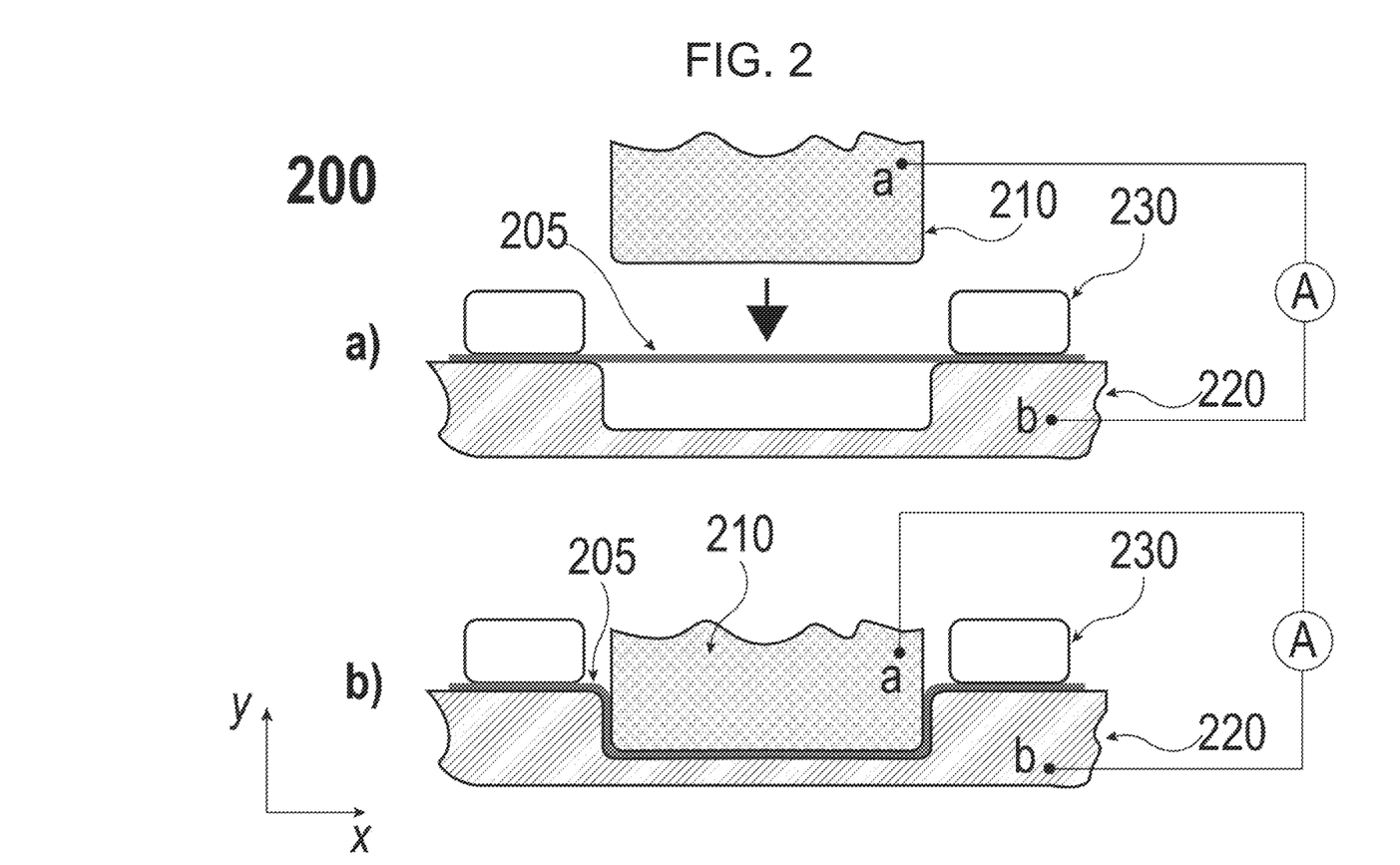
FIG. 2 is a cross-sectional view of a battery case shaping apparatus according to a first embodiment.

FIG. 2 is a sectional view of a battery case shaping apparatus 200 according to a first embodiment of the present invention.

Referring to FIG. 2, the battery case shaping apparatus 200 according to the first embodiment of the present invention includes a punch 210 configured to press a laminate sheet 205 in order to form a battery case; a die 220 having formed therein an accommodation portion corresponding in size to an electrode assembly receiving portion formed by the punch 210; a holder 230 configured to fix the outer edge of the laminate sheet 205; and a current measurement portion A configured to measure current between the punch 210 and the die 220.

The punch 210 and the die 220 constitute electrodes, and the current measurement portion A is connected to electrode terminals a and b thereof. When the laminate sheet 205 is disposed between the punch 210 and the die 220, voltage may be applied to measure a current value therefor. Although the current measurement portion A is simply shown in FIGS. 2 to 5, the current measurement portion may include a portion configured to apply direct-current voltage and an ammeter configured to measure current flowing between a and b after application of voltage, or impedance between a and b may be measured after application of alternating-current voltage.

In the case in which the laminate sheet 205 is disposed, the punch 210 and the die 220 must be electrically insulated from each other. At this time, it is preferable for the punch 210 and the holder 230 to also be insulated from each other. The reason for this is that, in a normal case, whether the insulated laminate sheet 205 is abnormal is measured based on the magnitude of current and in that, when the punch 210 and the die 220 are electrically connected to each other, it is difficult to determine whether the laminate sheet 205 is abnormal. Furthermore, if each of the punch 210 and the holder 230 is not insulated, the punch 210 and the die 220 may be electrically connected to each other due to contact between the punch 210 and the holder 230 and contact between the die 220 and the holder 230. It is preferable for the punch 210 and the holder 230 to be electrically insulated from each other.

FIG. 2a) shows the state before the laminate sheet 205 is pressed using the punch 210, and FIG. 2b) shows the state after pressing is performed. In the present invention, current or impedance between the electrode terminals a and b may be measured immediately after completion of pressing or shaping, whereby it is possible to immediately determine whether the shaped laminate sheet 205 is abnormal.

The shaped laminate sheet 205 has a three-dimensional shape, not a planar shape. For accurate detection, therefore, the punch 210 and the die 220 having the two electrode terminals a and b disposed so as to be spaced apart from the entire surface of the shaped laminate sheet 205 by the same distance are used, whereby it is possible to obtain results with high accuracy.

Figure 3:
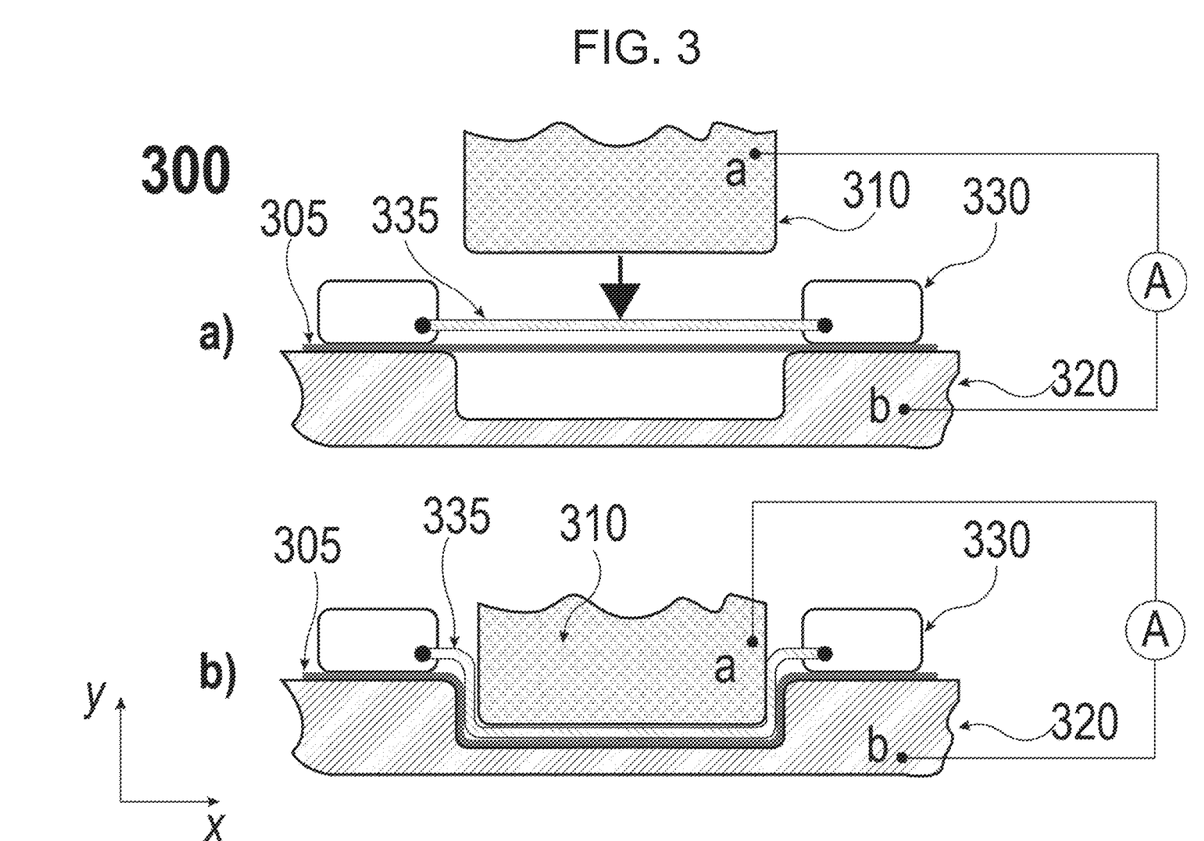
FIG. 3 is a cross-sectional view of a battery case shaping apparatus according to a second embodiment.

FIG. 3 is a sectional view of a battery case shaping apparatus 300 according to a second embodiment of the present invention. The battery case shaping apparatus 300 of FIG. 3 is configured by adding a conductive elastic separator 335 to the battery case shaping apparatus 200 according to the first embodiment of the present invention of FIG. 2.

In order to prevent direct contact between a punch 310 and a laminate sheet 305, a conductive elastic separator 335 located under the punch 310 may be added, and the conductive elastic separator 335 may be made of a conductive elastic rubber material. The conductive elastic separator 335 may be fixed to a lower part of a side surface of a holder 330. A liquid lubricant may be added to a space defined by the conductive elastic separator 335 and the holder 330. At this time, the liquid lubricant must be conductive.

The liquid lubricant remarkably reduces the force of friction between the punch and the conductive elastic separator, whereby the surface of the conductive elastic separator and the surface of the punch may very smoothly slip relative to each other.

As a result, the region of the laminate sheet that is elongated by the punch is increased, and therefore the average elongation of the elongated region may be reduced. For example, the thickness of the laminate sheet in an elongated state may be about 70% or more the thickness of the laminate sheet before elongation.

For example, at least one selected from the group consisting of hydrocarbon-based oil, such as liquid paraffin, grease, mineral vegetable oil, an emulsified oil, an antiemulsifier, a pour point depressant, a viscosity modifier, an antifoaming agent, mineral oil including pure mineral oil or pure mineral oil including an additive, a fatty oil including animal oil and vegetable oil, a blended oil of mineral oil and a fatty oil, and a synthetic oil may be used as the liquid lubricant. In order to secure conductivity, an ionic material or an ionic liquid may be added.

In the case in which the liquid lubricant is used, as described above, it is possible to prevent a local region of the laminate sheet from being excessively elongated.

If the laminate sheet and the punch directly contact each other, slip does not easily occur due to friction between the surfaces of the laminate sheet and the punch. As a result, the region of the laminate sheet that is elongated is narrowed, and therefore only a local region of the laminate sheet is elongated. Specifically, since the portion of the laminate sheet that becomes a side wall of the electrode assembly receiving portion when the laminate sheet is shaped into the battery case is mainly elongated, the thickness of the portion is excessively reduced, and therefore the battery case is easily damaged.

Since a stick-slip phenomenon easily occurs on the surface of the laminate sheet and the surface of the punch, as described above, the laminate sheet may be locally excessively elongated, and therefore a battery case shaping defect rate may be increased.

In the present invention, the laminate sheet 305 is pressed by the punch 310 in the state in which the conductive elastic separator 335 is disposed between the laminate sheet 305 and the punch 310, and therefore the surface of the laminate sheet 305 and the surface of the punch 310 do not directly contact each other. Consequently, it is possible to solve a conventional problem in that the laminate sheet is scratched due to a non-smooth surface of the punch or introduction of foreign matter between the punch and the laminate sheet.

However, it is preferable for the elastic separator to be made of a conductive material in order to measure current. If the elastic separator is not made of a conductive material, very high voltage must be applied in order to measure current, which is very dangerous to a person who performs measurement. For this reason, it is preferable for the elastic separator to be conductive. The conductive elastic separator may be manufactured by mixing a conventional separator made of an elastic resin or rubber material with a conductive polymer.

Since the conductive elastic separator 335 is fixed to the holder 330, the state in which the conductive elastic separator 335 is fixed to the holder 330 may be stably maintained when the laminate sheet 305 is pressed using the punch 310.

Figure 4:
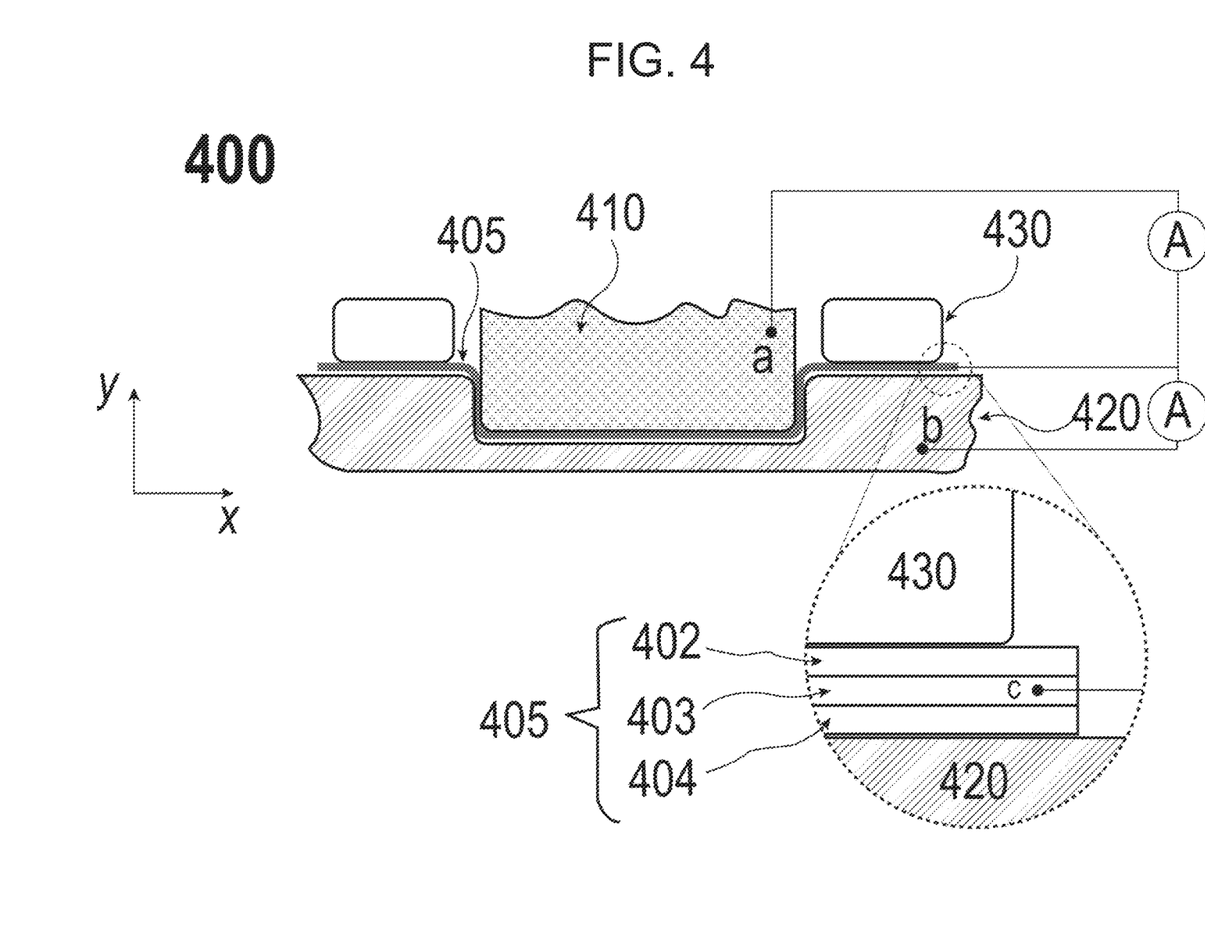
FIG. 4 is a cross-sectional view of a battery case shaping apparatus according to a third embodiment.

FIG. 4 is a sectional view of a battery case shaping apparatus 400 according to a third embodiment of the present invention.

The battery case shaping apparatus 400 is different from the battery case shaping apparatus 200 according to the first embodiment in that voltage is applied between a metal blocking layer 403 of a laminate sheet 405 and a punch 410 to measure current and voltage is applied between the metal blocking layer 403 of the laminate sheet 405 and a die 420 to measure current.

In the case in which whether the laminate sheet 405 is abnormal is measured using the battery case shaping apparatus 400 according to the third embodiment of the present invention, it is possible to accurately check which surface of the laminate sheet 405, i.e. which of an outer coating layer 402 and an inner adhesive layer 404, is damaged, whereby it is possible to minutely check whether the apparatus is abnormal.

In step S4, which is a step of measuring current while applying voltage, voltage may be applied between the metal blocking layer of the laminate sheet and the punch to measure current, and voltage may be applied between the metal blocking layer of the laminate sheet and the die to measure current.

In the first embodiment, the second embodiment, and the third embodiment of the present invention, only characteristic parts are emphasized, and therefore these embodiments may be combined with each other. For example, the second embodiment and the third embodiment may be combined with each other.

Figure 5:
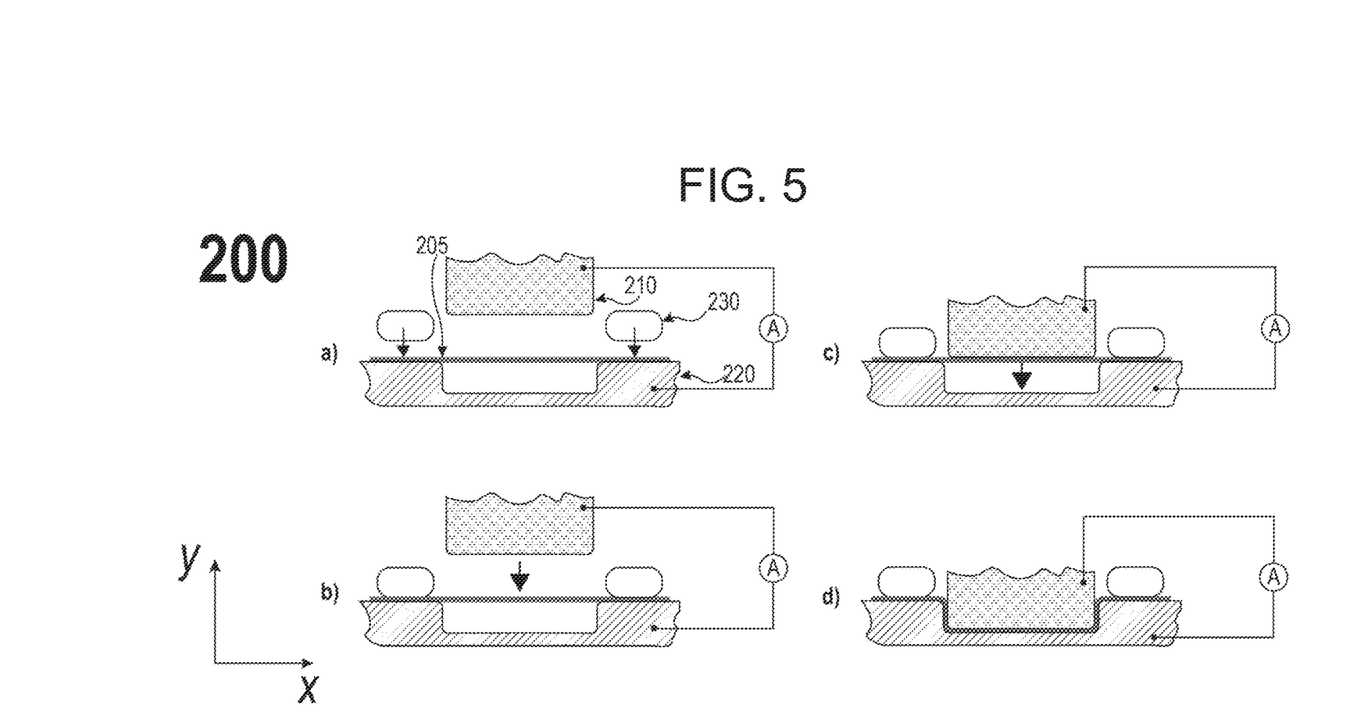
FIG. 5 shows cross-sectional views of the battery case shaping apparatus according to the first embodiment, arranged in operation sequence.

FIG. 5 shows sectional views of the battery case shaping apparatus according to the first embodiment of the present invention arranged in operation sequence. The sequence of FIG. 5 may equally apply to the second embodiment, the third embodiment, or combinations of these embodiments, in addition to the first embodiment.

A punch pin hole inspection method of a battery cased shaped using the battery case shaping apparatus includes S1) a step of disposing a laminate sheet 205 on a die 220 (see FIG. 5a)); S2) a step of fixing the laminate sheet 205 to the die 220 using a holder 230 (see FIG. 5b)); S3) a step of pressing the laminate sheet 205 using a punch 210 (see FIG. 5c)); and S4) a step of measuring current while applying voltage between the punch 210 and the die 220.

For the second embodiment, in which the conductive elastic separator is added, the punch 210 may simultaneously press the conductive elastic separator and the laminate sheet in step S3). For the third embodiment, voltage may be applied between the metal blocking layer of the laminate sheet and the punch to measure current, and voltage may be applied between the metal blocking layer of the laminate sheet and the die to measure current in step S4, which is the step of measuring current while applying voltage.

Meanwhile, in step S4), current may be measured while voltage is changed, or impedance may be measured while applying alternating current.

In step S4), it is preferable to maintain uniform distance between the punch and the die. This means that the punch and the die are spaced apart from each other by a uniform distance at all positions in the state in which the laminate sheet is disposed between the punch and the die. The reason for this is that, only when the punch and the die are spaced apart from each other by a uniform distance, it is possible to check abnormality through flow of current in the entire area.

In step S4), whether punch pin holes are formed may be determined based on whether current flows, and when current flows at a voltage lower than a reference voltage, abnormality of pin holes may be determined.

Those skilled in the art to which the present invention pertains will appreciate that various applications and modifications are possible within the category of the present invention based on the above description.

DESCRIPTION OF REFERENCE SYMBOLS 100, 200, 300, 400: Battery case manufacturing apparatuses
105, 205, 305, 405: Laminate sheets
402: Outer coating layer
403: Metal blocking layer
404: Inner adhesive layer
110, 210, 310, 410: Punches
120, 220, 320, 420: Dies
130, 230, 330, 430: Holders
335: Elastic separator
a, b, c: Electrode terminals
A: Ammeter

The invention claimed is:

1. A battery case shaping apparatus comprising:
a punch configured to press a laminate sheet in order to form a battery case including an electrode assembly receiving portion;
a die forming an accommodation portion corresponding in size to the electrode assembly receiving portion;
a holder configured to fix an outer edge of the laminate sheet;
a conductive elastic separator located under the punch and configured to prevent direct contact between the punch and the laminate sheet; and
a current measurement portion configured to measure current between the punch and the die.

2. The battery case shaping apparatus according to claim 1, wherein the punch and the die constitute electrodes, and wherein, when the laminate sheet is disposed between the punch and the die, the current measurement portion applies voltage to measure the current between the punch and the die.

3. The battery case shaping apparatus according to claim 2, wherein, when the laminate sheet is disposed between the punch and the die, the punch and the die are electrically insulated from each other.

4. The battery case shaping apparatus according to claim 1, wherein the conductive elastic separator is made of a conductive elastic rubber material.

5. The battery case shaping apparatus according to claim 1, wherein the conductive elastic separator is fixed to a lower part of a side surface of the holder.

6. The battery case shaping apparatus according to claim 5, wherein the conductive elastic separator is spaced apart from the laminate sheet when the punch is spaced apart from the conductive elastic separator.

7. A punch pin hole inspection method of a battery case shaped using the battery case shaping apparatus according to claim 1, the punch pin hole inspection method comprising:
S1) disposing a laminate sheet on the die;
S2) fixing the laminate sheet to the die using the holder;
S3) pressing the laminate sheet using the punch; and
S4) measuring current while applying voltage between the punch and the die.

8. The punch pin hole inspection method according to claim 7, wherein, in step S4), current is measured while voltage is changed.

9. The punch pin hole inspection method according to claim 7, wherein, in step S4), uniform distance is maintained between the punch and the die.

10. The punch pin hole inspection method according to claim 7, wherein, in step S4), whether punch pin holes are formed is determined based on whether current flows.

11. The punch pin hole inspection method according to claim 10, wherein, when current flows at a voltage lower than a reference voltage, abnormality of pin holes is determined.

12. A punch pin hole inspection method of a battery case shaped using the battery case shaping apparatus according to claim 1, the punch pin hole inspection method comprising:
S1) disposing a laminate sheet on the die;
S2) fixing the laminate sheet to the die using the holder;
S3) pressing the laminate sheet using the punch; and
S4) measuring impedance while applying alternating current.

13. A punch pin hole inspection method of a battery case shaped using the battery case shaping apparatus according to claim 1, the punch pin hole inspection method comprising:
S1) disposing a laminate sheet on the die;
S2) fixing the laminate sheet to the die using the holder;
S3) pressing the laminate sheet using the punch; and
S4) applying a voltage between a metal blocking layer of the laminate sheet and the punch to measure a current between the metal blocking layer and the punch and applying a further voltage between the metal blocking layer and the die to measure a current between the metal blocking layer and the die.

* * * * *